(12) United States Patent
Axelsson (10) Patent No.: US 8,578,881 B2
(45) Date of Patent: Nov. 12, 2013

(54) ARRANGEMENT FOR GRIPPING AT LEAST ONE TEAT CUP

(75) Inventor: Thomas Axelsson, Farsta (SE)

(73) Assignee: DeLaval Holding AB, Tumba (SE)

( * ) Notice: Subject to any disclaimer, the term of this patent is extended or adjusted under 35 U.S.C. 154(b) by 244 days.

(21) Appl. No.: 13/130,783

(22) PCT Filed: Dec. 11, 2009

(86) PCT No.: PCT/EP2009/066932
§ 371 (c)(1),
(2), (4) Date: May 24, 2011

(87) PCT Pub. No.: WO2010/072586
PCT Pub. Date: Jul. 1, 2010

(65) Prior Publication Data
US 2011/0226184 A1    Sep. 22, 2011

(30) Foreign Application Priority Data
Dec. 22, 2008    (SE) .................................... 0802653

(51) Int. Cl.
*A01J 5/04* (2006.01)
(52) U.S. Cl.
USPC .................. 119/14.45; 119/14.47; 119/14.08
(58) Field of Classification Search
USPC .......... 119/14.45, 14.01, 14.08, 14.47, 14.02, 119/14.03, 14.11
IPC ..................................... A01J 5/00,5/003, 5/017
See application file for complete search history.

(56) References Cited

U.S. PATENT DOCUMENTS

| | | | | |
|---|---|---|---|---|
| 5,524,572 | A | * | 6/1996 | Dessing et al. ............ 119/14.02 |
| 5,634,428 | A | * | 6/1997 | Koster .......................... 119/14.1 |
| 5,909,716 | A | * | 6/1999 | van der Lely .............. 119/14.08 |
| 6,334,406 | B1 | * | 1/2002 | Eriksson .................... 119/14.02 |
| 2004/0200421 | A1 | * | 10/2004 | Andersson et al. .......... 119/14.1 |
| 2008/0022933 | A1 | | 1/2008 | Wase et al. |
| 2010/0058990 | A1 | | 3/2010 | Danneker et al. |
| 2010/0186676 | A1 | * | 7/2010 | Van Der Berg ............ 119/14.08 |

FOREIGN PATENT DOCUMENTS

| | | | |
|---|---|---|---|
| DE | 3021357 A1 | * 6/1980 | ............... B25J 15/06 |
| DE | 30 21 357 A1 | 2/1982 | |
| DE | 198 17 323 A1 | 10/1999 | |
| JP | 3-149194 A | 6/1991 | |

(Continued)

OTHER PUBLICATIONS

International Search Report, dated Aug. 10, 2010, from corresponding PCT application.

(Continued)

*Primary Examiner* — Andrea Valenti
(74) *Attorney, Agent, or Firm* — Young & Thompson (57) ABSTRACT

A gripping arrangement is provided including a storing device (10) adapted to hold a teat cup (1) in a parked position and a gripping device (2) adapted to grip the parked teat cup (1) in the storing device (10). The gripping device (2) includes a contact surface (6*a*) which is adapted to be moved to a position in which it comes in contact with a contact surface (1*d*) of the teat cup (1) during a gripping operation of the teat cup (1). The arrangement includes an adjusting part which is able to adjust the position of at least one of the contact surfaces (1*d*, 6*a*) in relation to the other contact surface (1*d*, 6*a*) from an initial contact position to a grip position in which the gripping device is able to grip the teat cup in the storing device.

22 Claims, 4 Drawing Sheets

(56) References Cited

FOREIGN PATENT DOCUMENTS

| RU | 1777728 | A1 | 11/1992 |
| SU | 1554841 | A1 | 4/1990 |
| SU | 1 707 632 | A1 | 1/1992 |
| WO | 00/72665 | A1 | 12/2000 |
| WO | 2005/122753 | A1 | 12/2005 |
| WO | 2008/118069 | A1 | 10/2008 |

OTHER PUBLICATIONS

Supplementary International Search Report, dated Mar. 31, 2011, from corresponding PCT application.

* cited by examiner

ARRANGEMENT FOR GRIPPING AT LEAST ONE TEAT CUP

BACKGROUND OF THE INVENTION AND PRIOR ART

The present invention relates to an arrangement for gripping at least one teat cup, wherein the arrangement comprises a storing device adapted to hold the teat cup in a parked position and a gripping device adapted to grip the parked teat cup in the storing device and wherein the gripping device comprises a contact surface which is adapted to be moved to a position in which it is in contact with a contact surface of the teat cup during a gripping operation of the teat cup.

Usually, a milking robot for automatic milking of animals comprises a robot arm provided with a gripper for gripping one or several teat cups at a time parked in a teat cup magazine. The robot arm is adapted to grip and move the teat cups from the teat cup magazine and attach them to the teats of an animal. Normally, the robot arm is provided with a gripper comprising movable jaws or the like which are closed around a teat cup during a gripping operation of the teat cup in a teat cup magazine.

US 2008/0022933 shows a gripper mounted on a robot arm of a milking robot. The gripper comprises an electromagnet adapted to grip a teat cup of a magnetic material in a teat cup magazine and move it to a teat cup attaching position. In one embodiment of this invention, the gripper is provided with two electromagnets arranged at a distance from each other. This gripper is able to grip two teat cups at a time which are parked in a teat cup magazine.

However, the action of the magnetic force from an electromagnet decreases very fast with the distance. Consequently, the gripper has to be moved to a grip position of a teat grip with a very high precision in order to grip the teat cup in a reliable manner. Furthermore, the teat cups have to be parked in predetermined positions in a teat cup magazine with a very high precision. Such requirements of the gripper and the teat cup magazine results in a relatively expensive product.

SUMMARY OF THE INVENTION

The object of the present invention is to make it possible to use a relatively simple storing device and a relatively simple gripping device for gripping parked teat cups in a reliable manner and with a high precision.

This object is obtained according to the invention by the feature that the arrangement comprises adjusting means comprising a movably arranged grip portion of the gripping device and/or a movably arranged positioning element of the storing device which are able to adjust the position of at least one of said contact surfaces in relation to the other contact surface when they are in contact with each other from an initial contact position to a grip position in which the gripping device is able to grip the teat cup in the storing device. According to the invention, it is possible to move the gripping device towards the teat cups to an initial contact position with a relatively rough control of the motion of the gripping device. Thereafter, the adjusting means adjusts the mutual position of the contact surfaces to a grip position in which the gripping device is capable to grip the teat cup. Such an adjustment of the mutual position of the contact surfaces may be provided with a very high precision. Thereby, it is possible to grip the teat cups in a reliable manner and with a high precision. In this case, it is not necessary to hold the teat cup in a predetermined position in the storage device with a high accuracy and use a gripping device which is able to be moved to an initial contact position with the teat cup with a high precision. Consequently, a relative simple storing device and a relatively simple gripping device can be used. The cost for the arrangement including such a storing device and such a gripping device can be relatively low.

According to a preferred embodiment of the invention, the gripping device is adapted to act with a pressing force on the contact surfaces during said adjustment of the contact surface from the initial contact position to the grip position. In order to adjust the mutual position of the contact surfaces some force has to be used. A pressing force from the gripping device is a suitable force for this purpose. Preferably, the contact surface of the gripping device has a complementary shape to the contact surface of the teat cup. Such a design of the contact surfaces facilitates the mutual motion between the contact surfaces from the contact position to the grip position. The gripping device may have a concave contact surface of a complementary shape to an outer convex surface of the teat cup. In this case, the contact surfaces can easily be moved to a grip position in which the contact surfaces are in an optimal contact. In this case, it is easy to accomplish a grip position with a very high accuracy.

According to a further embodiment of the invention, said adjusting means is able to adjust the position of the contact surface of the gripping device in relation to the contact surface of the teat cup. In this case, the contact surface of the gripping device may be adjusted in relation to a fixed contact surface of the teat cup from the initial contact position to the grip position. The adjusting means may comprise a moveable suspension device arranged between the grip portion of the gripping device which comprises said adjustable contact surface and a base part of the gripping device. Thus, the gripping device comprises two parts which are movably arranged in relation to each other. Preferably, the suspension device comprises a resilient member adapted to move the grip portion with a spring force to a primary position in relation to the base part. Thereby, the resilient member holds the grip portion in a predetermined position in relation to the base portion in an unloaded state. The resilient member may be adapted to act with a spring force against the pressing force from the gripping device. Thereby, the contact surfaces are pressed together with a yieldable force of a defined value which together with the shape of the contact surfaces provides the motion of the contact surface of the gripping device in relation to the contact surface of the teat cup. The resilient member may be a spring member of a metal material such as a coil spring, Bellville washer or the like. The resilient member may also be a suitably shaped piece of an elastic material such as a rubber material.

According to a further embodiment of the invention, the gripping device comprises grip means for releasably gripping the teat cup. The grip means may comprise a mechanical grip member with movable jaws or the like which are closed around a teat cup in the storing device during a gripping operation. Preferably however, the grip means comprises an electromagnet adapted to releasably grip a surface of a magnetic material of a teat cup. The electromagnet may include a coil feedable with a current and a core of a magnetic material. The electromagnet may comprise the contact surface of the grip device. The electromagnet may be provided with side walls, which comprise the contact surface of the gripping device, arranged on a respective side of the electromagnet. The side walls can be a part of the electromagnet. Alternatively, the side walls are made of a non-magnetic material. In this case, the contact surfaces of the side walls has only the purpose to be in contact with the contact surface of the teat cup and guide the grip member to the grip position in which the electromagnet is in contact with the teat cup. An alternative to an electromagnet is a suction member which is adapted to releasably grip a surface of a teat cup. The suction member may be connected to a vacuum source creating a negative pressure in the suction member such that it can releasably grip a teat cup in the storing device.

According to a further embodiment of the invention, the adjusting means is able to adjust the position of the contact surface of the parked teat cup in relation to the contact surface of the gripping device. In this case, the contact surface of the teat cup is adjusted in relation to the contact surface of the gripping device from the initial contact position to the grip position. The adjusting means may comprise a movable suspension device arranged between the positioning element adapted to hold the teat cup in a parked position and a stationary element of the storing device. In this case, the storing device comprises two parts which are movably arranged in relation to each other. It is of course possible to use adjusting means which adjusts the positions of both contact surfaces, Preferably, the suspension device comprises a resilient member adapted to move the teat cup with a spring force to a primary parked position in relation to the stationary element. Thereby, the resilient member holds the teat cup in a predetermined position in relation to the stationary element in an unloaded state. The resilient member may be adapted to act with a spring force against pressing force from the gripping device. Thereby, the contact surfaces are pressed together with a yieldable force of a defined value which together with the shape of the contact surfaces provides the motion of the contact surface of the teat cup in relation to the contact surface of the gripping device, The resilient member may be a spring member of a metal material such as a coil spring, Bellville washer or the like. The resilient member may also be a suitably shaped piece of an elastic material such as a rubber material.

According to a further embodiment of the invention, the gripping device comprises at least two gripping devices which each are adapted to grip a teat cup at a time parked in the storing device. When two or more teat cups are to be gripped at the same time by a gripping device, the requirements of the mutual positions of the grip member and the teat cups increases further in order to accomplish a reliable gripping operation. It is especially preferred to use the adjusting means according to this embodiment in these cases. Preferably, the gripping device forms a part of or is connected to a robot arm adapted to attach teat cups to a milking animal. The robot arm and the control of the robot arm may be made simpler with the use of the adjusting means according to the invention.

BRIEF DESCRIPTION OF THE DRAWINGS

In the following, preferred embodiments of the invention are described by examples and with references to the attached drawings, in which.

BRIEF DESCRIPTION OF PREFERRED EMBODIMENTS OF THE INVENTION

Figure 1:
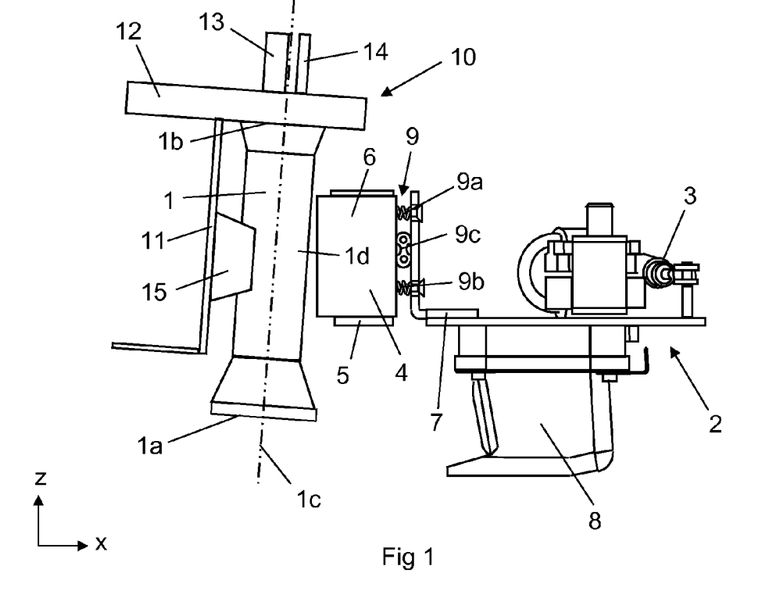
FIG. 1 shows a first embodiment of an arrangement for gripping two teat cups in a vertical plane z-x.
Figure 2:
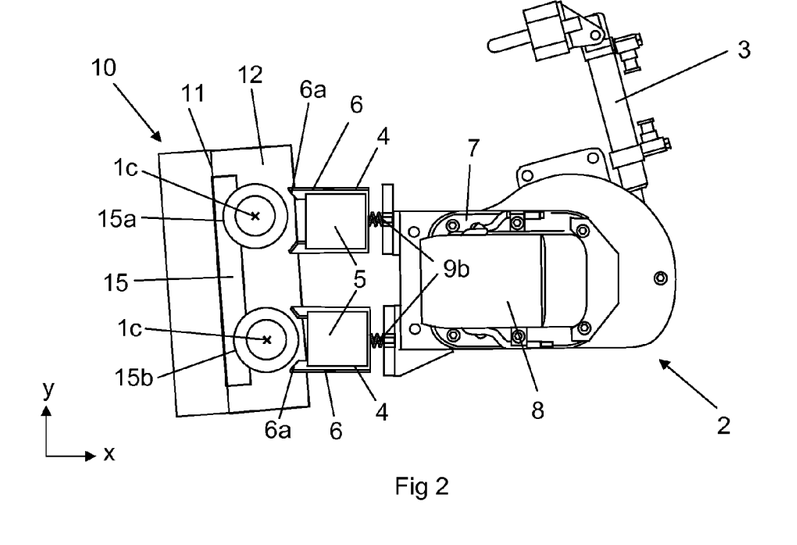
FIG. 2 shows the arrangement in FIG. 1 for gripping the two teat cups in a horizontal plane y-x.
Figure 3:
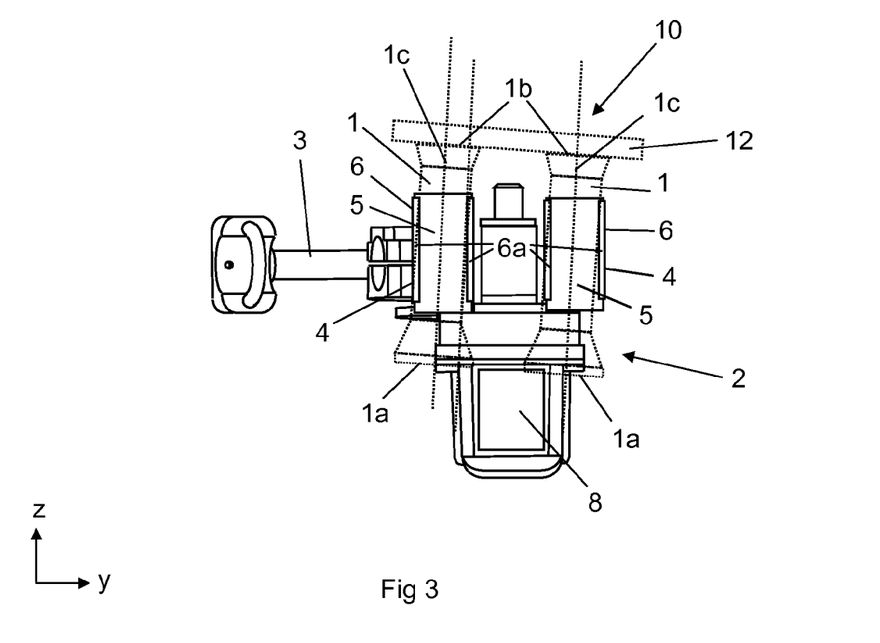
FIG. 3 shows the arrangement in FIG. 1 for gripping the two teat cups in a vertical plane z-y.

FIGS. 1-3 show an arrangement for gripping teat cups 1. The gripping operation of the teat cups 1 is shown in three planes of a coordinate system x, y, z. The axes x and y are perpendicular axes in a horizontal plane. The axis z is vertical and the normal to the horizontal plane. The arrangement comprises a gripping device 2 forming a part of a robot arm 3. The robot arm 3 is adapted to attach teat cups 1 to the teats of a milking animal. The milking animal may be a cow. The teat cups 1 have an elongated substantially cylindrical shape with a first end surface 1a provided with a recess for receiving a teat of a milking animal and an oppositely located second end surface 1b. Each teat cup 1 has a center axis 1c extending centrally through the teat cup 1 and its end surfaces 1a, 1b. In this case, the gripping device 2 comprises two substantially identically designed grip portions 4 arranged at a distance from each other. Each grip portion 4 comprises an electromagnet 5 arranged between two side walls 6. At least a part of the teat cups 1 is made of a magnetic material. Thereby, it is possible to grip the teat cups 1 by means of the electromagnets 5 of the respective grip portions 4. The side walls 6 are provided with contact surfaces 6a having a complementary shape to the outer surface 1d of the teat cups 3. The gripping device 2 comprises a base portion 7 provided with a camera 8. The camera 8 is adapted to detect the position of teats of a milking animal during an attachment process of the teat cups 1. The camera 8 may also be used to detect the position of the teat cups 1 during a gripping operation by the grip portions 4.

The grip portions 4 are connected to the base portion 7 by means of a resilient suspension device 9. In this case, the resilient suspension device 9 comprises a first suspension member 9a and a second suspension member 9b located at a distance from each other and an intermediate suspension member 9c. The first suspension member 9a and a second suspension member 9b have a corresponding design. The design of the suspension members 9a, 9b is shown more in detail in FIG. 4. The intermediate suspension member 9c consists of a material piece of a flexible material such as a rubber material.

The storing device 10 comprises a rear wall element 11 connected to a stationary upper element 12. The upper element 12 comprises parking surfaces for the second end surfaces 1b of the teat cups 1. The parking surfaces are directed downwards such that the center axes 1c of the parked teat cups 1 are substantially in parallel with the vertical z axis. A milk conduit 13 and a pulsation conduit 14 are connected to the second end surface 1b of the respective teat cups 1. Each parking surface of the upper element 12 is provided with a through hole for the milk conduit 13 and the pulsation conduit 14. Retraction cylinders or the like, which not are shown in the Figs, are arranged in a position above the storing device 10. One retraction cylinder for each teat cup 1 may be used. The retraction cylinders are adapted to provide a pulling force in the milk conduits 13, when a milking process has been finished, such that the teat cups 1 are removed from the teats of a milking animal and retracted to the parking surfaces of the upper element 12. The storing device 10 comprises a positioning element 15 arranged on the rear wall element 11. The positioning element 15 comprises recesses 15a, 15b having a suitable shape. The recesses 15a, 15b are adapted to receive outer convex surfaces 1d of teat cups 1 when then they are parked in the storing device 10. The positioning element 15 defines together with the parking surfaces of the upper element 12 the parking positions of the teat cups 1 in the storing device 10.

FIG. 1 shows the gripping device 2 and the storing device 10 during a gripping operation in the vertical plane x-z. It is visible here that the center axes 1c of the teat cups 1 incline somewhat in relation to the vertical axis z. Thus, the teat cups 1 are not perfectly parked in this plane. FIG. 2 shows the gripping device 2 and the storing device 10 from below in the horizontal plane x-y. It is visible here that the positions of the center axes 1c of the teat cups 1 differ somewhat on the x axis. Thus, the teat cups 1 are not either perfectly parked in this plane. FIG. 3 shows the gripping device 2 and the storing device 10 from the vertical plane y-z. The storing device 10 and the parked teat cups 3 are shown with broken lines such the grip member 2 located behind is visible. The center axes 1c of the teat cups 1 incline somewhat in relation to the vertical axis z. Consequently, the teat cups 3 are not either perfectly parked in this plane.

Figure 4:
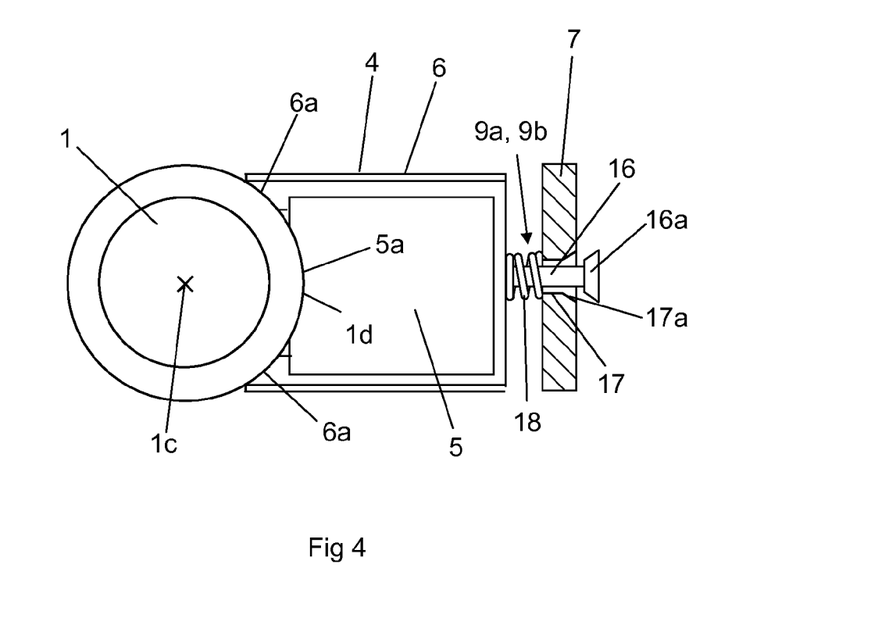
FIG. 4 shows more closely the movable grip portion of the arrangement in FIG. 1-3.

FIG. 4 shows the first suspension member 9a and the second suspension member 9b of the resilient suspension device 9 more in detail. The suspension members 9a, 9b are arranged between the base portion 7 of the gripping device 2 and one of the grip portions 4. The suspension members 9a, 9b comprises each a guide pin 16 fixedly attached to the grip portion 4. The guide pin 16 comprises, at an outer end, a head portion 16a with a conical shape. The guide pin 16 is arranged in a hole 17 in the base portion 7. The hole 17 has an end portion 17a with a corresponding conical shape as the head portion 16a of the guide pin 16. The guide pin 16 has a smaller cross section area than the cross section area of the hole 17 except in the head portion 16a. A spring member 18 is mounted around the guide pin 16 in a space between the grip portion 4 and the base portion 7. The spring member 18 is adapted to move the grip portion 4 to a primary position in relation to the base portion 7 in which the outer periphery of the conical head portion 16a of the guide pin 16 comes in contact with the inner periphery of the conical end portion 17a of the hole 17.

When a milking process is to be performed, the robot arm 3 moves the gripping device 2 to a position in front of the parked teat cups 1 in the storing device 10. The robot arm 3 turns the gripping device 2 to a position in which the camera 8 consists the lowest part of the gripping device 2 as best seen in FIG. 1. The camera 8 records the positions of the teat cups 1 and the robot arm 3 moves the grip portions 4 towards the respective teat cups 1. The grip portions 4 are arranged at substantially the same distance from each other as the parked teat cups 1 in the storing device 10. The robot arm 3 moves the grip portions 4 into contact with the teat cups 1. Due to the above-mentioned inexactnesses of the parking positions of the teat cups 1 in the storing device 10, only a part of the contact surfaces 6a of the grip portions 4 will come in contact with the contact surface 1d of the teat cups 1 during the initial contact. However, the robot arm 3 continues to move the gripping device 2 towards the teat cups 1 such that the contact surfaces 6a of the grip portions 4 acts with a pressing force on the contact surfaces 1d of the teat cups 1. The pressing force compresses the spring members 18 of the first suspension member 9a and the second suspension member 9b and the flexible material in the intermediate suspension member 9c. Thereby, the head portions 16a of the guide pins 16 of the first suspension member 19a and the second suspension member 9b are displaced out of engagement with the conical end portions 17a of the holes 17, which is seen in FIG. 4.

In this state, the guide pins 16 are adjustable to a substantially arbitrary position inside the holes 17 since the guide pins 16 have a smaller cross section area than the holes 17. An adjustment of the guide pins results in a corresponding adjustment of the grip portions 4 in relation to the base portion 7 of the grip member 2. In this case, the grip portions 4 may be adjusted to an inclined position in an arbitrary direction in relation to base portion 7. The inclination of the grip portion 4 may be a few degrees. The intermediate suspension member 9c also allows such an adjustment. The pressing force ensures that the contact surfaces 6a of the grip portions 4 are adjusted to the complementary shaped contact surfaces 1d of the teat cups 1. The fixed contact surfaces 1d of the teat cups 1 guides the movable contact surfaces 6a of the grip portions 4 to a grip position in which they obtain an optimal contact with the contact surfaces 1d of the teat cups 1. In this grip position, the electromagnets 5 obtain contact with the contact surface 1d of the teat cups 1 within a contact area such that the gripping device 2 is able to grip the teat cup 1 in the storing device 10 by a magnetic force. The arrangement above makes it possible to grip the teat cups 1 in a storing device 10 with a very high precision by a gripping device 2 in spite of the fact that the teat cups 1 are not positioned in perfect parking positions in the storage device 10. Such a high precision gripping operation may be performed by means of a relatively simple storing device 10 and a relatively simple robot arm 3.

Figure 5:
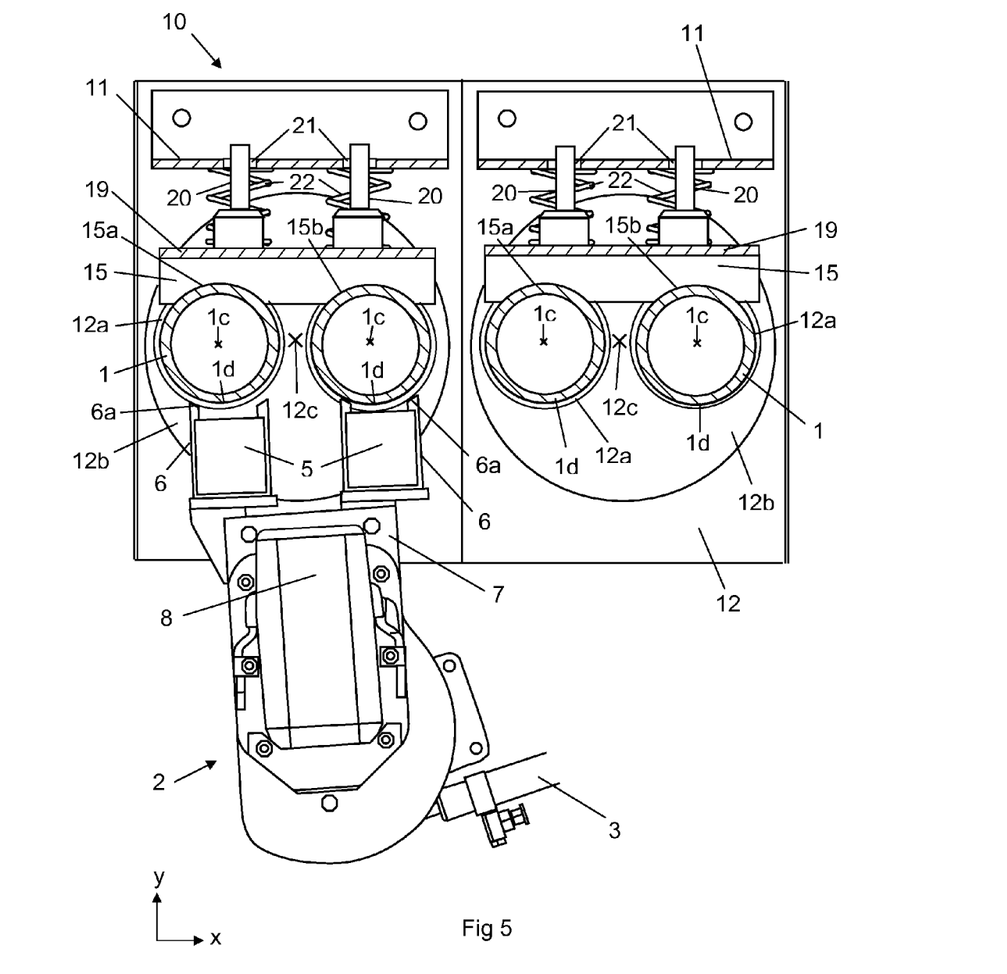
FIG. 5 shows a second embodiment of an arrangement according to the invention.

FIG. 5 shows a storage device 10 for parking of four teat cups 1. The storing device 10 is shown from below in a horizontal x-y plane. The storage device 10 comprises a stationary upper element 12 seen from below. The stationary upper element 12 comprises four rotatable parking elements 12a comprising parking surfaces for teat cups 1. The parking surfaces are directed downwards such that center axis 1c of the parked teat cups 1 is in parallel with a normal to the plane x-y. The rotatable parking elements 12a are arranged in pairs in a respective larger circular element 12b. Each larger circular element 12b is in its turn rotatable around a vertical axis 12c in the stationary upper element 12. The pairs of rotatable parking elements 12a are arranged on opposite sides and at a corresponding distance from the vertical axes 12c through the respective larger circular element 12b. The rotatable parking elements 12a may comprise an opening for a milk conduit and a pulsation conduit.

The storing device 10 comprises positioning elements 15 comprising concave recesses 15a, 15b adapted to receive a pair of teat cups 1 when they are in a parked in the storing device 10. The positioning element 15 defines together with the parking surfaces of the rotatable parking elements 12a the parking positions of the teat cups 1 in the storing device 10. The positioning elements 15 are attached on a respective vertical wall element 19 which is fixedly mounted on one of the larger circular elements 12b. The positioning elements 15, the vertical wall elements 19 and the larger circular elements 12b are as a unit rotatably arranged in the storing device 10 around the vertical axis 12c. However, the rotary motion of this unit is restricted by a resilient suspension device arranged between the respective vertical wall elements 19 and a stationary vertical rear wall element 11 of the storage device 10. The resilient suspension device comprises for each rotatable unit two guide pins 20. An end portion of the respective guide pin 20 is connected to the vertical wall elements 19 and an opposite end portion of the guide pins 20 is arranged in an elongated slot 21 of the stationary rear wall element 11. The elongated slots 21 allow motions of the guide pins 20 in the horizontal x-y plane but restrict motions in a vertical direction. Spring members 22 are arranged in a space between the vertical wall elements 19 and the stationary rear wall elements 11.

Figure 6:
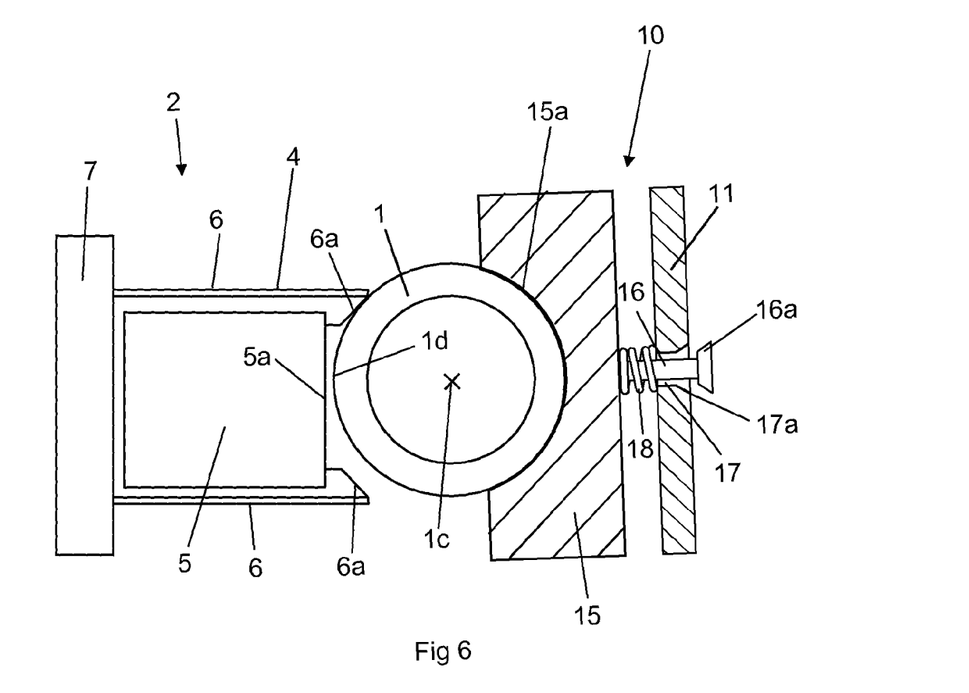
FIG. 6 shows a third embodiment of an arrangement according to the invention and FIG. 7 shows a fourth embodiment of an arrangement according to the invention.

When a milking process is to be performed, the robot arm 3 moves the gripping device 2 to a position in front of two of the parked teat cups 1 in the storing device 10. In this case, a gripping device 2 is used comprising two grip portions 4 fixedly connected to a base portion 7 of the gripping device 2. The robot arm 3 turns the gripping device 2 to a position in which the camera 8 consists the lowest part of the gripping device 2. The camera 8 records the positions of the teat cups 1 and the robot arm 3 moves the grip portions 4 in a direction substantially along the y axis towards the respective teat cups 1. The grip portions 4 are arranged at the same distance from each other as the parked teat cups 1 in the storing device 10. The robot arm 3 moves the grip portions 4 into contact with the teat cups 1. In this case, the robot arm 3 is not itself able to move the grip portions 4 to a perfect position in the horizontal plane y-x in relation to the teat cups 1. Due to this fault of position of the grip portions 4, the contact surface 6a of one of the grip portions 4 will first come in contact with the contact surface 1d of the teat cup 1. However, the robot arm 3 continues to move the gripping device 2 towards the teat cups 1 until the contact surfaces 6a of both grip portions 4 are in contact with the teat cups 1. In this state, the two spring members 22 of the resilient suspension device have been unequally compressed and the larger circular element 12b has been rotated a small distance around the vertical axis 12c. During this gripping operation, the contact surface 6a on one side of the respective grip portions 4 comes in contact with the contact surface 1d of the teat cups 1 before the contact surface 6a on the opposite side of the grip portions 4 comes in contact with the contact surface 1d of the teat cups 1. Since the parking elements 12a are rotatable, there will be no relative motions between the contact surfaces 6a and the contact surface 1d of the teat cups 1 when they have come in contact with each other. The rotation of the parking elements 12a eliminates the risk of wear of the contact surface 1d of the teat cups 1 during the gripping operation. In this rotated state of the larger circular element 12, the positioning element 15 and the pair of teat cups 1 have been adjusted to a somewhat inclined position in relation to the horizontal x axis. The contact surfaces 1d of the teat cups 1 have been adjusted to a grip position in which they are in optimal contact with the contact surfaces 6a of the grip portions 4. In this grip position, the electromagnets 5 of the respective grip members 4 are in contact with the contact surface 1d of the teat cups 1 within a contact area such that the gripping device 2 is able to grip the pair of teat cups 1 in the storing device 10 by a magnetic force. The robot arm 3 moves the gripped pair of teat cups 1 to a teat attaching position from which it attaches the teat cups 1 to the teats of a milking animal. Then, the robot arm 3 fetches the remaining pair of teat cups 1 in a corresponding manner. The spring members 22 moves the positioning elements 15 back to the primary positions when the robot arm 3 has removed the teat cups from the storing device 10. The above mentioned resilient suspension of the positioning elements 15 makes it possible to adjust the positions of a pair of parked teat cups 1 to the position of a pair of grip portions 4 in the horizontal plane x-y, FIG. 6 shows a cross section view of a positioning element 15 in a storage device 10. The positioning element 15 comprises a concave recesses 15a adapted to hold a teat cup 1 in a parked position in the storing device 10 The storing device 10 may also comprise an upper element defining a parking surface for the teat cup 1 in a corresponding manner as in the above described embodiments. The storing device 10 comprises a stationary vertical wall element 11 which support the positioning element 15 by means of a resilient suspension member. The suspension member has a substantially corresponding construction and function as the suspension members 9a, 9b shown in FIG. 4. The suspension member comprises a guide pin 16 fixedly attached to the positioning element 15. The guide pin 16 comprises, at an outer end, a head portion 16a with a conical shape. The guide pin 16 is arranged in a hole 17 in the stationary vertical wall element 11. The hole 17 has an end portion 17a with a corresponding conical shape as the head portion 16a of the guide pin 16. The guide pin 16 has a smaller cross section area than the cross section area of the hole 17 except in the head portion 16a. A spring member 18 is mounted around the guide pin 16 in a space between the positioning element 15 and the stationary vertical wall element 11. The spring member 18 is adapted to move the positioning element 15 to a primary position in relation to the stationary vertical wall element 11 in which the outer periphery of the conical head portion 16a of the guide pin 16 comes in contact with the inner periphery of the conical end portion 17a of the hole 17. In this case, a gripping device 2 is used which is adapted to grip one teat cup at a time in the storage device 10. The grip portion 4 is here fixedly connected to a base portion 7 of the gripping device 2.

When a milking process is to be performed, the robot arm 3 moves the grip portion 4 into contact with the parked teat cup 1 in the storing device 10. In this case, the grip portion 4 does not come in contact with the parked teat cup 1 in a perfect manner. As a consequence, one of the contact surfaces 6a of the grip portions 4 first comes in contact with the contact surface 1d of the teat cup 1. When the robot arm 3 continues to move the grip portion 4 towards the teat cups 1, this contact surface 6a of the grip portions 4 acts with a pressing force on the contact surface 1d of the teat cups 1 and the positioning element 15. The pressing force acting on the positioning element 15 compresses the spring member 18 and displaces the head portions 16a of the guide pin 16 out of engagement with the conical end portion 17a of the hole 17 in the stationary rear wall element 11. The suspension member is seen in this loaded state in FIG. 6.

In this state, the guide pin 16 is adjustable to a substantially arbitrary position inside the hole 17 since the guide pin 16 has a smaller cross section area than the hole 17. An adjustment of the guide pin 16 results in a corresponding adjustment of the positioning element 15. In this loaded state, the positioning element 15 may be adjusted to an inclined position in an arbitrary direction in relation to the stationary rear wall element 11. The maximum inclination of the positioning element 15 may be a few degrees. The pressing force from the grip portion makes that the contact surface 1d of the teat cup 1 will be adjusted in relation to the complementary shaped contact surface 6a of the grip portion 4. The contact surface 6a of the grip portion guides the movable contact surfaces 1d of the teat cup 1 to a grip position in which they obtain an optimal contact. In this grip position, a contact surface 5a of the electromagnets obtains contact with the contact surface 1d of the teat cups 1 within a contact area such that the gripping device 2 is able to grip the teat cup 1 in the storing device 10 by a magnetic force. It is of course possible to use several such suspension members for supporting the positioning element. A suspension member according to the intermediate suspension member 9c may also be used.

Figure 7:
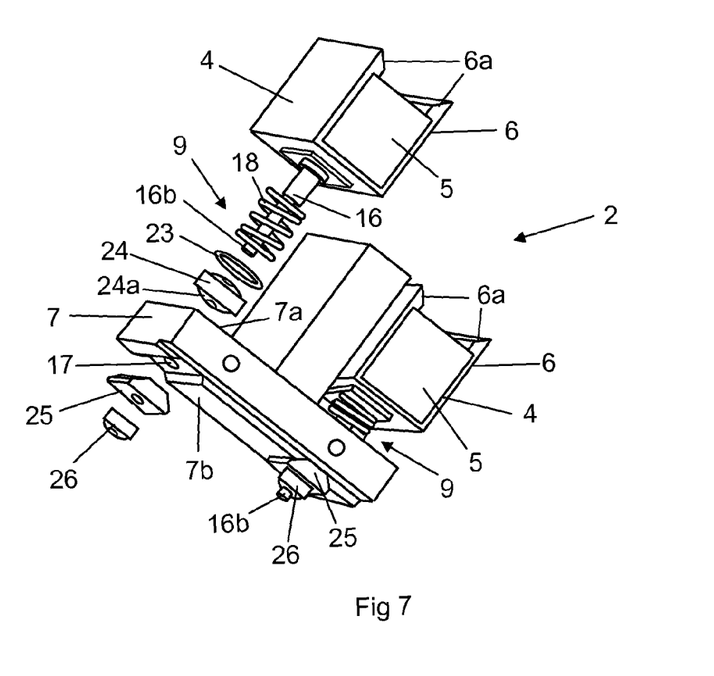

FIG. 7 shows a gripping device 2 comprising two grip portions 4. The gripping portions 4 are connected to a base portion 7 of a gripping device 2 by means of a respective resilient suspension device 9. One grip portion 4 is shown in a non-mounted state and the other grip portion 4 is shown in a mounted state. The grip portions 4 are fixedly attached to a respective guide pin 16. The guide pins 16 are adapted to be mounted in a respective hole 17 in the base portion 7. The guide pins 16 have a smaller cross section area than the cross section area of the holes 17. A spring member 18, a washer 23 and a positioning member 24 are mounted around the respective guide pins 16 in a space between the grip portion 4 and a first side 7a of the base portion 7. The positioning member 24 comprises a front surface 24a having a spherical-shape adapted to be mounted in contact with a substantially plane surface of the first side 7a of the base portion 7. In a mounted state, the spring member 18 presses the spherical surface 24a of the positioning member 24 against the plane surface of the first side of the base portion 7. A wedge-shaped element 25 is mounted around the pin guides 16 on an opposite second side 7b of the base portion 7. The wedge-shaped elements 25 are adapted to be mounted in wedge-shaped recesses on the second side 7b of the base portion 7. The guide pins 16 comprise, at an outer end, a threaded portion 16b. A nut 26 is adapted to be mounted on the threaded portion 16b of the guide pins 16 on the second side 7b of the base portion 7.

When a milking process is to be performed, the gripping device 2 is moved by a not shown robot arm 3 to a position in front of two not shown parked teat cups 1 in a storing device 10. The grip portions 4 are arranged at substantially the same distance from each other as the parked teat cups 1 in the storing device 10. The grip portions 4 are moved into contact with the teat cups 1. Mostly, only a part of the contact surfaces 6a of the grip portions 4 will first come in contact with the teat cups 1 during the initial contact.

However, the robot arm 3 continues to move the gripping device 2 towards the teat cups 1 such that the contact surfaces 6a of the grip portions 4 acts with a pressing force on the teat cups 1. The pressing force compresses the spring members 18 of the suspension members 9. Thereby, the wedge-shaped members 25 are displaced out of engagement with the wedge-shaped recess on the second side 7b of the base portion 7.

Since the guide pins 16 have a smaller cross section area than the holes 17 in the base portion 7, the front surfaces 24a of the spherical shape members 24 may be inclined in relation to the plane surface on the first side 7a of the base portion 7. Thereby, the guide pins 16 may be moved to a substantially arbitrary angle in relation to the base portion 7. The adjustment of the guide pins 16 results in a corresponding adjustment of the grip portions 4 in relation to the base portion 7 of the grip member 2. In this case, the grip portions 4 may be independently adjusted to an inclined position in an arbitrary direction in relation to base portion 7. The inclination of the grip portion 4 may be a few degrees. The pressing force ensures that the contact surfaces 6a of the grip portions 4 are adjusted to the complementary shaped contact surfaces of the teat cups 1. The contact surfaces of the teat cups 1 guides the movable contact surfaces 6a of the grip portions 4 to a grip position in which they obtain an optimal contact with the teat cups 1. In this grip position, the electromagnets 5 obtain contact with the teat cups 1 within a contact area such that the gripping device 2 is able to grip the teat cups 1 at the same time in the storing device 10.

The invention is not limited to the described embodiments but may be varied and modified freely within the scope of the claims. In the above-mentioned embodiments, the gripping device 2 or the storing device 10 comprises a resilient suspension device. It is of cause possible that both the gripping device 2 and the storing device 10 comprise a resilient suspension device. In this case, the respective resilient suspension devices may be able to adjust positions of the contact surfaces in difficult directions and planes.

The invention claimed is:

1. An arrangement for gripping a teat cup (1), comprising:
a storing device (10) comprising a wall element (11) connected to a positioning element (15), the positioning element (15) adapted to hold a teat cup (1) in a parked position;
a gripping device (2) comprising a grip portion (4) connected to a base portion (7), the grip portion (4) having a teat cup contact surface (6a) adapted to grip the parked teat cup (1) parked in the positioning element (15),
the gripping device (2) adapted to be moved, during a gripping operation of the teat cup (1), to an initial position in which the contact surface (6a) of the grip portion (4) is in contact with a contact surface (1d) of the teat cup (1) and then to a grip position in which the grip portion (4) is able to grip the teat cup (1) parked in the positioning element (15); and
a resilient suspension device (9) operatively connected between one of i) the wall element (11) and the positioning element (15) of the storing device (10), and ii) the base portion (7) and the grip portion (4) of the gripping device (2),
the resilient suspension device (9) comprising elements, through a pressing force from the gripping device, for displacing in a first axis direction (y) and inclining in an arbitrary direction in each of a second axis direction (x) and a third axis direction (z), one of i) the positioning element (15) and ii) the grip portion (4), when the contact surface (6a) of the grip portion (4) comes into contact with the contact surface (1d) of the teat cup (1) during the gripping operation,
wherein a hole (17) is defined through one of (i) the wall element (11) and (ii) the base portion (7), the hole (17) having an end portion (17a) tapered from a rear side of one of (i) the wall element (11) and (ii) the base portion (7) opposite a connection side of one of (i) the wall element (11) and (ii) the base portion (7) at which one of (i) the wall element (11) is connected to the positioning element (15) and (ii) the base portion (7) is connected to the grip portion (4), a portion of the resilient suspension device (9) being movable within the tapered end portion (17a) of the hole (17), and
as the gripping device (2) is moved from the initial contact position to the grip position during the gripping operation, the displacing and the inclining adjusts the contact surface (6d) of the grip portion (4) in relation to the contact surface (1d) of the teat cup (1) for the grip portion (4) to grip the teat cup (1) parked in the positioning element (15).

2. The arrangement of claim 1, wherein said elements of said resilient suspension device (9) include:
a guide pin (16, 20) mounted to one of the grip portion (4) and the positioning element (15),
a hole (17, 21) located in a corresponding one of the base portion (7) and the wall element (11), the guide pin extending through the hole, and
a spring member (18, 22) mounted around the guide pin in a space between i) the one of the grip portion (4) and the positioning element (15), and ii) the one of the base portion (7) and the wall element (11),
wherein an inside diameter of the hole is sufficiently greater than a cross section diameter of the guide pin so that the guide pin is adjustable to a substantially arbitrary position inside the hole allowing the inclining in the arbitrary direction in each of the second and third axis directions (x, z) for the one of the positioning element (15) and the grip portion (4), when the contact surface (6a) of the grip portion (4) comes into contact with the contact surface (1d) of the teat cup contact surface (6a) during the gripping operation.

3. The arrangement of claim 1, wherein said elements of said resilient suspension device (9) include:
a guide pin (16) mounted to the grip portion (4),
a hole (17) located in the base portion (7), the guide pin extending through the hole, and
a spring member (18) mounted around the guide pin in a space between the grip portion (4) and the base portion (7),
wherein an inside diameter of the hole is sufficiently greater than a cross section diameter of the guide pin so that the guide pin is adjustable to a substantially arbitrary position inside the hole allowing the inclining in the arbitrary direction in each of the second and third axis directions (x, z) of the grip portion (4), when the contact surface (6a) of the grip portion (4) comes into contact with the contact surface (1d) of the teat cup contact surface (6a) during the gripping operation.

4. The arrangement of claim 1, wherein said elements of said resilient suspension device (9) include:
plural guide pins (20) mounted to the positioning element (15),
plural holes (21) located in the wall element (11), each of the guide pins extending through a corresponding one of the holes, and
a spring member (18, 22) mounted around each guide pin in a space between the positioning element (15) the wall element (11),
wherein an inside diameter of each hole is sufficiently greater than a cross section diameter of the corresponding guide pin so that the guide pins are adjustable to a substantially arbitrary position inside the holes allowing the inclining in the arbitrary direction in each of the second and third axis directions (x, z) of the positioning element (15), when the contact surface (6a) of the grip portion (4) comes into contact with the contact surface (1d) of the teat cup contact surface (6a) during the gripping operation.

5. The arrangement of claim 1, wherein said elements of said resilient suspension device (9) include:
a guide pin (16) mounted to the grip portion (4),
a hole (17) located in the base portion (7), the guide pin extending through the hole, the hole having a larger inside diameter than a cross section diameter of the guide pin, and
a spring member (18) mounted around the guide pin in a space between the grip portion (4) and the base portion (7),
a positioning member (24) mounted around the guide pin between an end of the spring member and the base portion, the positioning member (24) comprising a front surface (24a) having a spherical-shape adapted to be mounted in contact with a substantially plane surface of a first side (7a) of the base portion (7), wherein, in a mounted state, the spring member (18) presses the spherical surface (24a) of the positioning member (24) against the plane surface of the first side of the base portion (7), and
a wedge-shaped element (25) mounted around the guide pin (16) on an opposite, second side (7b) of the base portion (7), in a wedge-shaped recess on the second side of the base portion, wherein, as the gripping device (2) is moved from the initial contact position to the grip position during the gripping operation, the wedge-shaped element (25) is displaced out of engagement with the wedge-shaped recess, and the front surface (24a) of the spherical shape member (24) is inclinable in relation to the plane surface on the first side (7a) of the base portion (7) allowing the guide pin (16) to be moved to a substantially arbitrary angle in relation to the base portion (7) and the grip portion (4) to be adjusted to an inclined position in the arbitrary directions in relation to base portion (7).

6. The arrangement of claim 1, wherein,
two of said gripping device (2) are connected to the base portion (7), and
said elements of said resilient suspension device (9) include:
a guide pin (16) mounted to each grip portion (4),
two holes (17) located in the base portion (7), each guide pin extending through a corresponding one of the holes, each hole having a larger inside diameter than a cross section diameter of the corresponding guide pin, and
a spring member (18) mounted around each guide pin in a space between each grip portion (4) and the base portion (7),
a positioning member (24) mounted around each guide pin between an end of the spring member and the base portion, the positioning members (24) comprising a front surface (24a) having a spherical-shape adapted to be mounted in contact with a substantially plane surface of a first side (7a) of the base portion (7), wherein, in a mounted state, the spring members (18) press the spherical surface (24a) of the positioning member (24) against the plane surface of the first side of the base portion (7), and
a wedge-shaped element (25) mounted around each guide pin (16) on an opposite, second side (7b) of the base portion (7), in a corresponding wedge-shaped recess on the second side of the base portion, wherein, as the gripping device (2) is moved from the initial contact position to the grip position during the gripping operation, the wedge-shaped elements (25) are displaced out of engagement with the wedge-shaped recesses, and the front surfaces (24a) of the spherical shape members (24) are inclinable in relation to the plane surface on the first side (7a) of the base portion (7) allowing the guide pins (16) to be moved independently to substantially arbitrary angles in relation to the base portion (7) and the two grip portions (4) to be independently adjusted to inclined positions in the arbitrary directions in relation to base portion (7).

7. The arrangement of claim 1, wherein the contact surface (6a) of the gripping device (2) has a complementary shape to the contact surface (1d) of the teat cup (1).

8. The arrangement of claim 1, wherein said resilient suspension device comprises a resilient member (9c, 18) adapted to move the grip portion (4) with a spring force to a primary position in relation to the base part (7).

9. The arrangement of claim 8, wherein said resilient member (9c, 18) is adapted to act with a spring force against the pressing force from the gripping device (2).

10. The arrangement of claim 1, wherein said grip means comprises an electromagnet (5) adapted to releasably grip the contact surface (1d) of the teat cup (1).

11. The arrangement of claim 10, wherein the electromagnet is provided with side walls (6), which side walls comprise the contact surface (6a) of the gripping device (2), each side wall arranged on a respective side of the electromagnet (5).

12. The arrangement of claim 1, wherein said elements of said resilient suspension device (9) include movable suspension elements (16-18, 19-22) arranged between the positioning element (15) and the wall element (11) of the storing device (10).

13. The arrangement of claim 12, wherein said movable suspension elements include a resilient member (18, 22) adapted to move the teat cup (1) with a spring force to a primary parked position in relation to the stationary element (11).

14. The arrangement of claim 13, wherein said resilient member (18, 22) is adapted to act with a spring force against the pressing force from the gripping device (2).

15. The arrangement of claim 1, wherein the gripping device (2) comprises at least two grip portions (4) each adapted to grip a teat cup (1) parked in the storing device (2).

16. The arrangement of claim 1, wherein the gripping device (2) forms a part of a robot arm (3) adapted to attach teat cups (1) to a milking animal.

17. The arrangement of claim 1, wherein the resilient suspension device (9) comprises a guide pin (16) fixedly attached to one of the (i) positioning element (15) and (ii) the grip portion (4), the guide pin (16) being movable within the tapered end portion (17a) of the hole (17).

18. The arrangement of claim 1, wherein the resilient suspension device is a single resilient suspension device.

19. An arrangement for gripping a teat cup (1), comprising:
    a storing device (10) comprising a wall element (11) connected to a positioning element (15), the positioning element (15) adapted to hold a teat cup (1) in a parked position;
    a gripping device (2) comprising a grip portion (4) connected to a base portion (7), the grip portion (4) having a teat cup contact surface (6a) adapted to grip the parked teat cup (1) parked in the positioning element (15),
    the gripping device (2) adapted to be moved, during a gripping operation of the teat cup (1), to an initial position in which the contact surface (6a) of the grip portion (4) is in contact with a contact surface (1d) of the teat cup (1) and then to a grip position in which the grip portion (4) is able to grip the teat cup (1) parked in the positioning element (15);
    a resilient suspension device (9) operatively connected between one of i) the wall element (11) and the positioning element (15) of the storing device (10), and ii) the base portion (7) and the grip portion (4) of the gripping device (2),
    the resilient suspension device (9) comprising elements, through a pressing force from the gripping device, for displacing in a first axis direction (y) and inclining in an arbitrary direction in each of a second axis direction (x) and a third axis direction (z), one of i) the positioning element (15) and ii) the grip portion (4), when the contact surface (6a) of the grip portion (4) comes into contact with the contact surface (1d) of the teat cup (1) during the gripping operation, the resilient suspension device (9) including a positioning member (24) having a front surface having a spherical-shape mounted between an end of the resilient suspension device (9) and a first side (7a) of the base portion (7), and a wedge-shaped element (25) mounted around a guide pin on an opposite, second side (7b) of the base portion (7), in a wedge-shaped recess on the second side of the base portion,
    wherein, as the gripping device (2) is moved from the initial contact position to the grip position during the gripping operation, the displacing and the inclining adjusts the contact surface (6d) of the grip portion (4) in relation to the contact surface (1d) of the teat cup (1) for the grip portion (4) to grip the teat cup (1) parked in the positioning element (15) by displacing the wedge-shaped element (25) in relation to the base portion (7) and inclining the positioning member (24) in relation to the base portion (7) allowing the grip portion (4) to be adjusted to an inclined position in the arbitrary directions in relation to the base portion (7).

20. An arrangement for gripping at least one teat cup (1), comprising:
    a storing device (10) comprising a stationary element (11) attached to a movably arranged positioning element (15), the positioning element (15) adapted to hold the teat cup (1) in a parked position;
    a movable gripping device (2) adapted to grip the parked teat cup (1) in the parked position in the storing device (10),
    during a gripping operation of the teat cup (1), the gripping device movable to an initial position with a contact surface (6a) of the gripping device (2) in contact with a contact surface (1d) of the teat cup (1); and
    an adjusting device arranged on the positioning element (15) and adapted to adjust the position of said contact surfaces (1d) of the teat cup in relation to the contact surface (6a) of the grip portion (4) when the contact surfaces (1d, 6a) are in contact with each other and the grip portion moves from the initial contact position to a grip position in which the gripping device is able to grip the teat cup in the storing device,
    said adjusting device comprises a movable suspension device (16-18, 19-22) arranged between the positioning element (15) and the stationary element (11) of the storing device (10).

21. The arrangement of claim 20, wherein said suspension device comprises a resilient member (18, 22) adapted to move the teat cup (1) with a spring force to a primary parked position in relation to the stationary element (11).

22. The arrangement of claim 21, wherein said resilient member (18, 22) is adapted to act with a spring force against the pressing force from the gripping device (2).

* * * * *